United States Patent [19]

Huang

[11] Patent Number: 5,469,231
[45] Date of Patent: Nov. 21, 1995

[54] SIMPLE FRAME FOR ENCASING THE GLASS PIECES OF EYE GLASSES

[76] Inventor: Chien-Hsing Huang, No. 1, Alley 330, Lane 800, Yu Nung Rd., Tainan, Taiwan

[21] Appl. No.: 105,544

[22] Filed: Aug. 12, 1993

[51] Int. Cl.$^6$ .................................................. G02C 1/08
[52] U.S. Cl. ................................ 351/92; 351/90; 351/106
[58] Field of Search .................................... 351/104, 106, 351/83, 90, 92, 41, 86, 108, 109, 101, 93

[56] References Cited

U.S. PATENT DOCUMENTS

| | | | |
|---|---|---|---|
| 2,239,266 | 8/1939 | Epstein | 351/92 |
| 2,682,196 | 6/1959 | Baldanza et al. | 351/83 |
| 5,355,184 | 10/1994 | Varveris et al. | 351/106 |

Primary Examiner—William L. Sikes
Assistant Examiner—Hung Xuan Dang
Attorney, Agent, or Firm—Pro-Techtor International

[57] ABSTRACT

The present invention concerns a simple frame for encasing the glass pieces of eye glasses. More particularly, said simple eye glasses frame is formed by employing a one-piece metal strip produced by drawing and joining the two ends thereof, and said metal strip is designed in such a manner that it can be formed into any desirable shape during assembly and binds securely onto the glass piece. Specifically, the upper part of the resulting frame is wider than the lower part thereof and possesses a tongue at the center, while the lower part of the resulting frame is thinner and the cross section thereof is round.

3 Claims, 6 Drawing Sheets

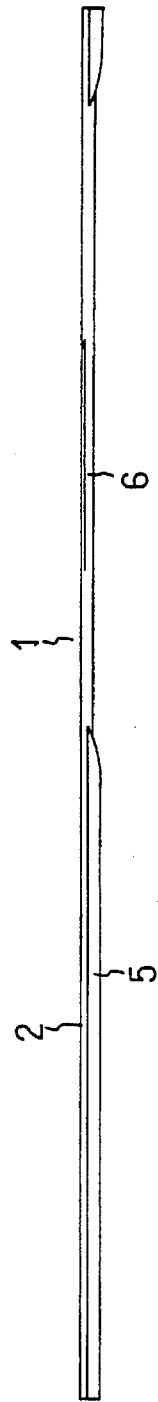
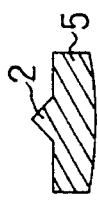
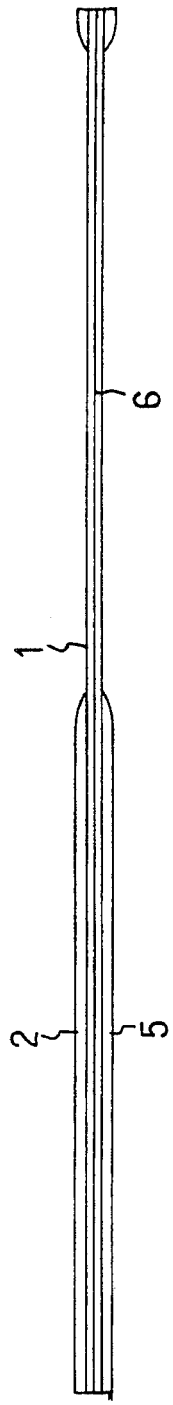
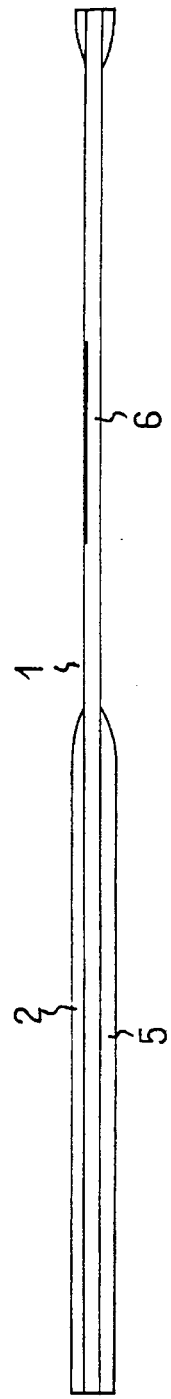
FIG.1  FIG.1-1  FIG.1-2  FIG.1-3  FIG.2  FIG.3

SIMPLE FRAME FOR ENCASING THE GLASS PIECES OF EYE GLASSES

DESCRIPTION OF THE INVENTION

The present invention concerns a simple frame for encasing the glass pieces of eye glasses. More particularly, said simple eye glasses frame is formed by employing a one-piece metal strip produced by drawing and joining the two ends thereof, and said metal strip is designed in such a manner that it can be formed into any desirable shape during assembly and binds securely onto the glass piece.

Conventional frames for encasing glass pieces are typically rigid and in a square shape, with the cross section thereof possessing a cavity for holding the glass piece. However, said configuration is subject to the following drawbacks:

1. Since conventional frames are of the rigid type, they are inflexible and the glass piece cannot be inserted easily into the groove, thereby causing the frame to be distorted and the rejection rate to increase.

2. Since the interior of the cavity of conventional frames is a flat surface, a snug fit between the glass piece and the frame cannot be achieved, thereby increasing the possibility of the glass piece dropping out from the frame.

Another conventional configuration involves the upper part being a frame and the lower pan being a thin rope for supporting the glass piece, and said thin rope is connected to the upper part by tying the two ends of said thin rope onto the through holes at the ends of the upper part. However, this configuration is also subject to the following drawbacks:

1. The thin rope must be tied to the through holes at the ends of the upper part of the frame before the glass piece can be inserted. Accordingly, the operation is labor intensive and the production cost is high, because the thin rope must be tied to the through holes manually, which is quite difficult and time consuming.

2. After the pair of glasses has been worn for a period of time, said thin rope may become loosen or crock due to degradation, causing the glass piece to fall out and the failure rate to increase.

3. The two ends of the upper part may have sharp comers, which is hazardous, because the user's face may be cut.

In light of the fact that the assembly of the glass piece into a conventional frame is somewhat difficult and time consuming, that the union of the glass piece with the frame is somewhat weak, resulting in the possibility that the glass piece may fall out, and that those companies that employ local workers in the assembly of glass pieces into conventional frames are faced with increasing economic pressure because the labor cost is substantially less in countries that are less developed, the inventor of the present invention, aided by many years of experience in the eye glasses-manufacturing industry, conducted diligent research aimed at developing an automatic system for the production of eye glasses, and arrived at the present invention, which concerns a simple frame for encasing the glass pieces of eye glasses. Additionally, the following merits are realized with the design improvement pertaining to the present invention:

1. Since the metal strip for forming the simple frame pertaining to the present invention is produced and connected by machines, the production of said simple frame can be conducted automatically, resulting in the realization of high-volume production and reduction in labor costs.

2. Since the production of said simple frame pertaining to the present invention can be conducted automatically, the rejection rate can be reduced, resulting in a reduction in manufacturing costs.

3. Sine the union between said simple frame pertaining to the present invention and the glass piece is tight, the glass piece does not fall out.

4. Since the lower frame is flexible, said metal strip can be inserted into the glass piece easily. Accordingly, less time is needed to produce a eye glasses frame.

5. Since said metal strip for forming the simple frame pertaining to the present invention can be formed into any desirable shape, various styles of eye glasses can be produced.

As shown in FIG. 1, the frame-forming strip 1 is a one-pie metal strip formed by drawing, and other materials, such as plastics, can also be used. The cross section of the left side of said frame-forming strip 1 is essentially rectangular and the center thereof is equipped with a triangular tongue (see FIG. 1—1) or a semi-circular tongue (see FIG. 1-2). The right side of said frame-forming strip 1 is more slender than the left side thereof, and possesses a triangular tongue that connects with the triangular tongue of the left side of said frame-forming strip 1. Additionally, the lower part of said right side of said frame-forming strip 1 is round, with the cross section thereof exhibiting a unique shape, as shown in FIG. 1-3. The end of the right side of said frame-forming strip 1 is also equipped with a short section which has the same shape as the left side thereof, as shown in FIGS. 2, 3, 4 and 5. The two ends of said frame-forming strip 1 can be joined to form an eye glasses frame 3, as shown in FIG. 6. Furthermore, said frame-forming strip 1 is designed in such a manner that the appearance of the eye glasses is not compromised. Specifically, said two ends are joined at the location where the eye glasses support 4 is placed, the left side of said frame-forming strip 1 becomes the upper part of the frame 5 and the fight side of said frame-forming strip 1 becomes the lower part of the frame 6. Since the end of the fight side of said frame-forming strip 1 is also equipped with a short section which has the same shape as the left side thereof, the joint between the upper part of the frame 5 and the lower part of the frame 6 is smooth and does not possess sharp comers. Before assembling a glass piece into said frame, the edge of the glass piece 7 is ground to produce a groove, so that the tongue 2 of the upper part of the frame 5 and the lower part of the frame 6 can be inserted into said glass piece 7. More specifically, the lower pan of the frame 6 can be inserted completely into the groove of said glass piece 7, as shown in FIGS. 8 and 8-1. In addition, said frame-forming strip 1 can be shaped into different styles, as shown in FIGS. 9 and 10, and the resulting frame can be attached onto any support, as shown in FIG. 11.

DESCRIPTION OF THE FIGURES

FIG. 1—1: The cross section of the left side of the frame-forming strip pertaining to the present invention.

FIG. 1-2: Another practical example of the cross section of the left side of the frame-forming strip pertaining to the present invention.

FIG. 1-3: An enlargement of the cross section of the fight side of the frame forming strip pertaining to the present invention.

FIG. 2: A top view of the frame-forming strip pertaining to the present invention.

FIG. 3: A top view of another practical example of the frame-forming strip pertaining to the present invention.

FIG. 8-1: A dissection figure showing the cross section of the union between the frame-forming strip pertaining to the present invention and a glass piece.

DESCRIPTION OF THE NOTATIONS

Figure 4:
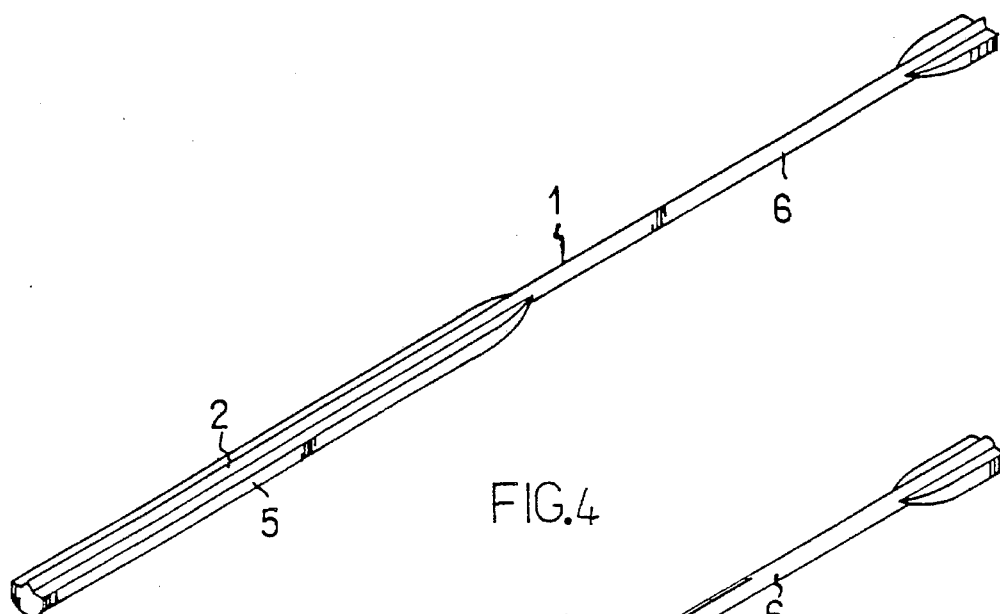
FIG. 4: A three-dimensional view of the frame-forming strip pertaining to the present invention.
Figure 5:
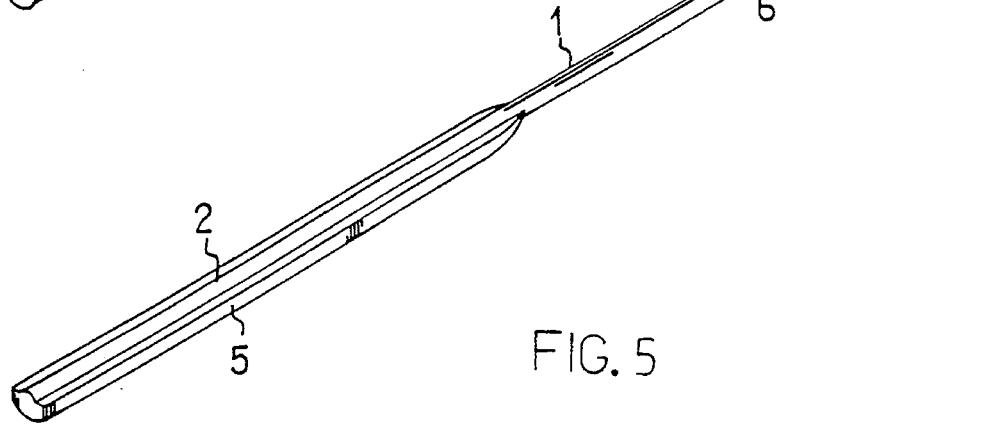
FIG. 5: A three-dimensional view of another practical example of the frame-forming strip pertaining to the present invention.
Figure 6:
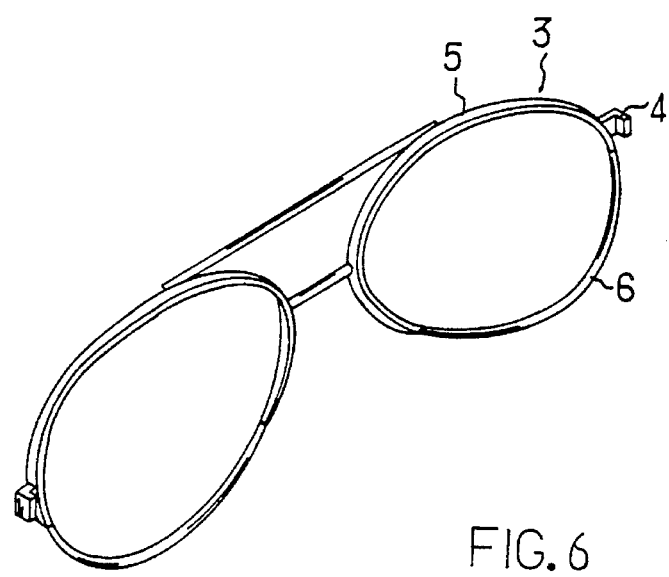
FIG. 6: A three-dimensional view of a frame formed with the frame-forming strip pertaining to the present invention.
Figure 7:
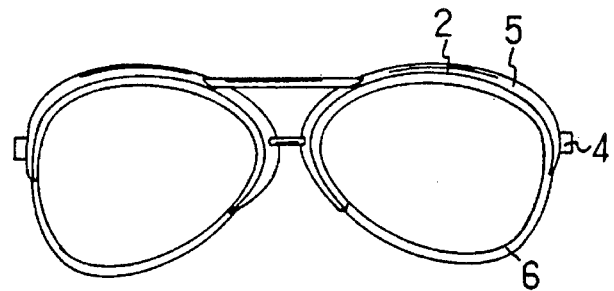
FIG. 7: A front view of a frame formed with the frame-forming strip pertaining to the present invention.
Figure 8:
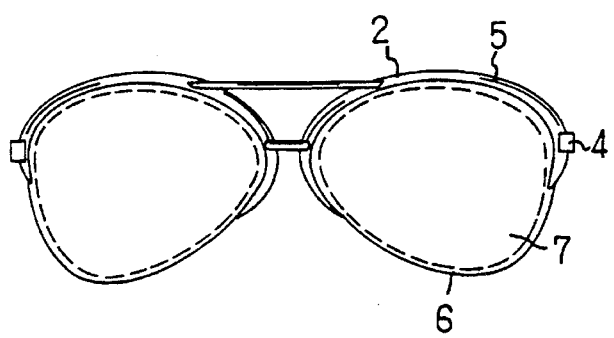
FIG. 8: A figure showing the union between the frame-forming strip pertaining to the present invention and a glass piece.
Figures 1, 8:
FIG. 1: The frame-forming strip pertaining to the present invention.
Figure 9:
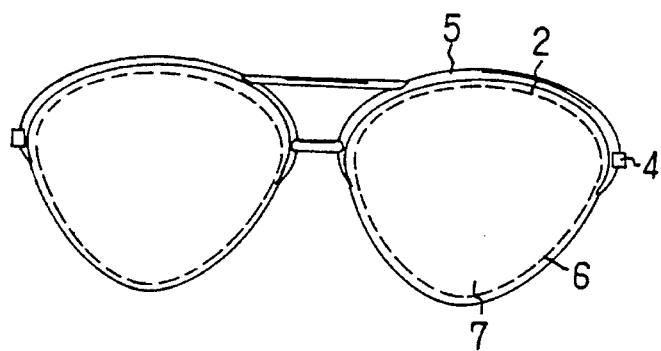
FIG. 9: Another practical example of the union between the frame-forming strip pertaining to the present invention and a glass piece.
Figure 10:
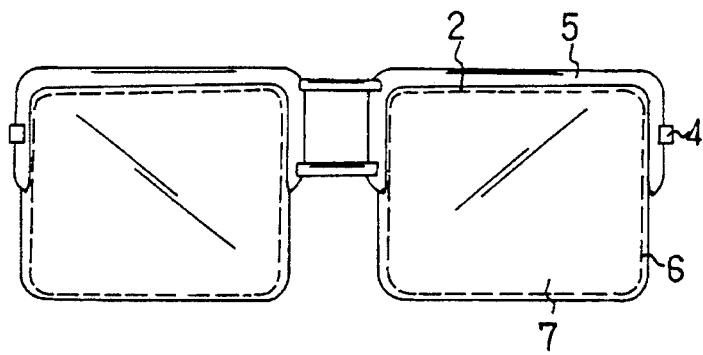
FIG. 10: Another practical example of the union between the frame-forming strip pertaining to the present invention and a glass piece.
Figure 11:
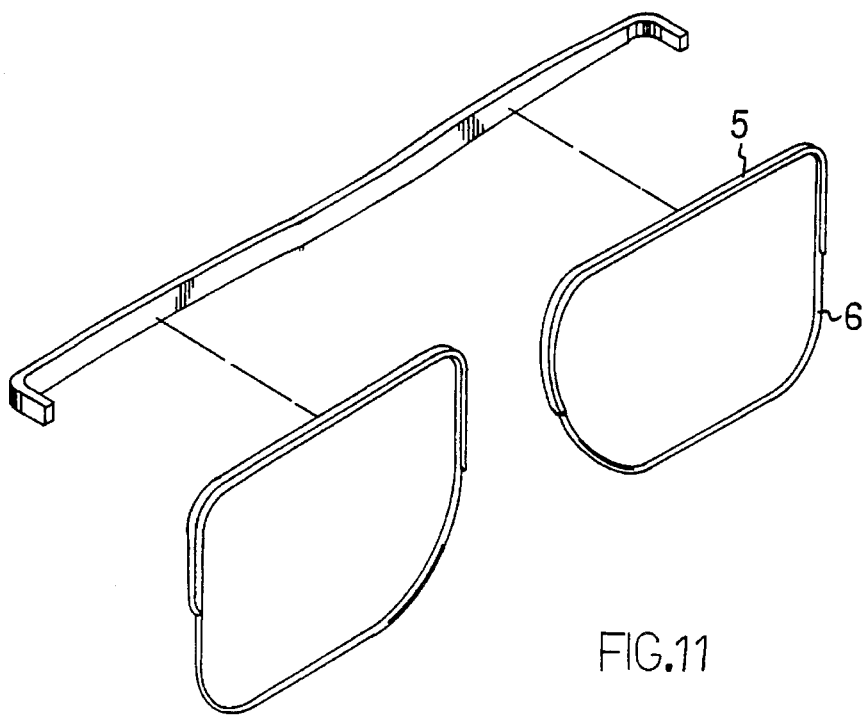
FIG. 11: A practical example of the attachment of the resulting frame pertaining to the present invention onto a support.
Figure 12:
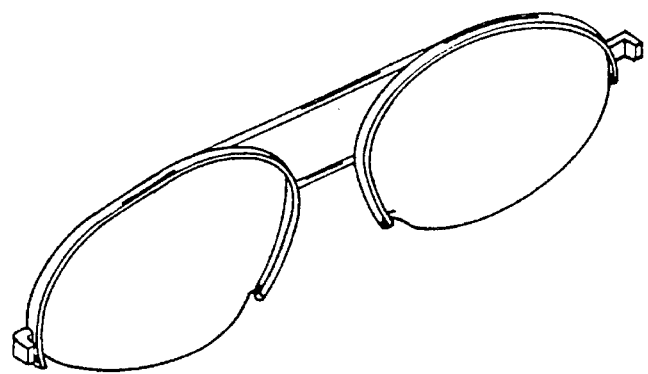
FIGS. 12–18: Are conventional eyeglasses.
Figure 13:
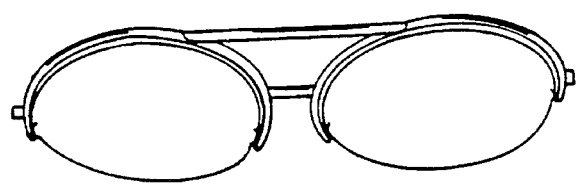
Figure 14:
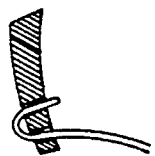
Figure 15:
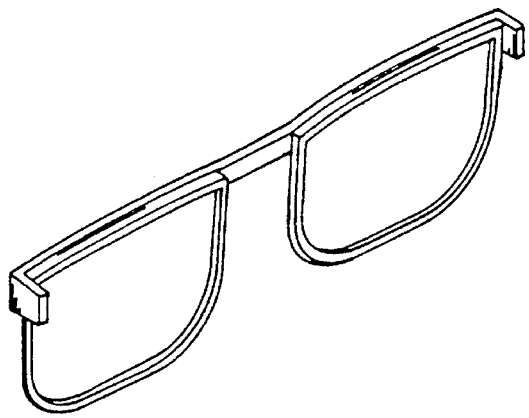
Figure 16:
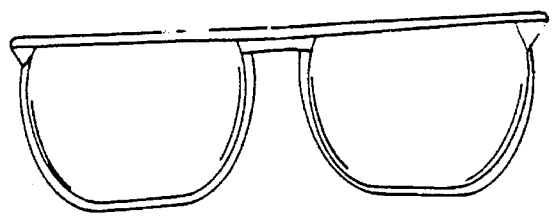
Figure 17:
Figure 18:

1 Frame-forming strip
2 Tongue
3 Frame
4 Support
5 The Upper Part of the Frame
6 The lower Part of the Frame
7 Glass Piece

I claim:

1. A frame for encasing the lenses of eye glasses comprising:

two flexible strips, each strip being adapted to enclose a lens of the eye glasses, said strips being flexible to accommodate various shapes of lenses;

said strips comprising a first segment with a raised tongue thereon, said first segment extending for approximately one half the length of said strip a second segment, said second segment being shorter and narrower than said first segment, a third segment having a cross section identical to that of said first segment, said third segment being shorter than said second segment; wherein said strips are wrapped around said lenses, a groove having been ground in an upper perimeter of said lenses to mate with the raised tongue of said strips, a joining point of said first segment and said third segment being chosen such that an earpiece of the eyeglasses is affixed at said joining point.

2. The frame of claim 1 wherein:

said raised tongue is triangular in cross section.

3. The frame of claim 1 wherein:

said raised tongue is semi-circular in cross section.

* * * * *